UNITED STATES PATENT OFFICE.

CHARLES W. DAVIS, OF EDGEWORTH, PENNSYLVANIA, AND DONALD M. SIMONS, OF NEW YORK, N. Y., ASSIGNORS TO STANDARD UNDERGROUND CABLE COMPANY, OF PITTSBURGH, PENNSYLVANIA, A CORPORATION OF PENNSYLVANIA.

METHOD OF MANUFACTURING INSULATION.

1,323,026.  Specification of Letters Patent.  Patented Nov. 25, 1919.

No Drawing.  Application filed April 3, 1918. Serial No. 226,416.

*To all whom it may concern:*

Be it known that we, CHARLES W. DAVIS, residing at Edgeworth, in the county of Allegheny and State of Pennsylvania, and DONALD M. SIMONS, residing at New York city, in the county of New York and State of New York, both citizens of the United States, have invented or discovered certain new and useful Improvements in Methods of Manufacturing Insulation, of which improvements the following is a specification.

Our invention relates to improvements in the production of impregnated porous insulation for electrical conductors. It finds particular practical application in the production of paper insulated electrical cables, but it is not in its general features limited to that specific service.

In the manufacture of cables and other articles, in which an electrical conductor is covered with an insulation of porous material filled or impregnated with insulating compound, it is often requisite to employ as the impregnating compound a substance of great viscosity, a substance which at ordinary atmospheric temperatures is scarcely to be called fluid at all, but approximates rather the solid condition. Such thick and viscid substances are particularly useful where a thinner, lighter, more liquid substance would, under service conditions, be apt to drain away from the porous body containing it, with the consequence that the effectiveness of the insulation would be impaired.

In order to apply such thick and viscid substances to the porous body to cause the porous body to become soaked full of them, it is necessary that the soaking or impregnation be accomplished at an elevated temperature—a temperature at which the normally viscid material becomes sufficiently fluid to enter into the pores of the body to be filled.

Coming now to particular illustration, and taking for illustration the case of a paper-insulated electrical cable, the paper insulation is ordinarily applied in the form of tape wrapped upon the electrical conductor. The paper is ordinarily applied in a somewhat moist condition because it takes up moisture from the air during the process of wrapping. After it has been applied, good practice requires that it be thoroughly dried and emptied of air by being placed in a closed chamber and by exhaustion of the air in the chamber. The impregnating substance is then admitted to the chamber while the vacuum is still maintained, and, in the case of such viscid impregnating material as we have mentioned above, it is necessary that the impregnation be effected at a relatively high temperature, as also explained above.

When once the impregnation has been accomplished a difficulty arises: if the thus far finished cable be removed from the bath of insulating compound while the bath is still hot, the still fluid material will partially drain away, the pores of the impregnated body will be in some degree emptied, and air spaces will be formed. These air spaces will remain after the lead sheath has been applied to the cable, or after it has otherwise been completed, and will be sources of weakness, injurious to the cable as an integral effective structure. If, on the other hand, the impregnated cable be allowed to remain in the bath, and the bath allowed to grow cold, then the bath is so thick and hard that it becomes something near an impossibility to get the thus far finished cable out of the viscid and all but solid body in which it lies. It can hardly be done successfully.

Our invention consists in providing, in addition to the bath of viscid material, a second bath of relatively light and fluid oil or other suitable liquid, which second bath is maintained cool, ordinarily at or near atmospheric temperature. When impregnation has been effected in the first bath, and while the bath and the contained cable are still hot, the cable is removed (as may then easily be done) from the first bath and quickly immersed in the second bath. The cold liquid of the second bath, coming into contact with the hot cable, will at once chill and harden the insulating compound in its pores and cause it to become viscid so it will not run out nor will it, even though the second bath be a bath of oil, diffuse in any appreciable degree in the lighter oil of the second bath. The cable so dealt with is allowed to grow cold in the second bath and, when it has grown cold, it may safely be removed, and introduced into the lead press, or otherwise dealt with. Instead of removing the cable from the hot to the cold bath in the manner just explained, the desired end may be accomplished by draining the hot viscid liquid from the chamber in which the cable has been impregnated and then evacuating the chamber and admitting sufficient thin cold oil or insulating compound to cover the impregnated cable. After the cable has been thoroughly cooled by contact with the cold oil or compound, it may be removed and sheathed with lead in the usual manner.

This invention of ours relates itself particularly to (and herein lies our further invention) the manufacture of such cables as are described in a co-pending application of Charles W. Davis. The cable of that application is a cable whose wrapped-on porous insulation is initially filled with a light oil of valuable dielectric properties; it is then submitted to further treatment, in which the light oil extending in films between the layers of porous insulation is to a greater or less degree replaced with viscid insulating compound. When the viscid compound has been applied, as it will be, by immersion in a heated bath, the thus far completed cable may be removed, still hot from the bath, and immediately plunged in a bath of cold liquid, in which it may be allowed to grow cold, and from which, when cold, it may safely be removed and further dealt with.

We claim as our invention:

1. The method of manufacturing insulated conductors which consists in enveloping a conductor in porous insulation, immersing the conductor so enveloped in a bath of insulating compound and maintaining it therein at elevated temperature, transferring such article under treatment from said bath to a second bath of cold liquid, and allowing it to grow cold in said second bath.

2. The method of manufacturing insulated conductors which consists in enveloping a conductor in porous insulation, immersing the conductor so enveloped in a bath of insulating compound at elevated temperature and in fluid state, which compound is viscid at atmospheric temperature, maintaining such article under treatment in such bath until impregnated, and immediately thereafter immersing the article under treatment in a second bath of cold liquid and allowing it to grow cold in said second bath.

3. The method of manufacturing insulated conductors which consists in enveloping a conductor in porous insulation built up in successive layers, impregnating such insulation with light oil, submerging the article under treatment with its insulation so impregnated in a thick insulating compound and maintaining it there for an interval of time at high temperature, transferring the article from such hot bath to a bath of cold liquid and allowing it to grow cold in such bath.

4. The method herein described of manufacturing electric cables which consists in enveloping a conductor in porous insulation, immersing the conductor so enveloped in a bath of insulating compound of relatively high viscosity and maintaining it therein at elevated temperature, transferring the article under treatment from such bath to a second bath of cold liquid of less viscosity, allowing it to grow cold in such second bath, withdrawing it from said second bath, and finally inclosing it in a suitable protecting envelop.

In testimony whereof we have hereunto set our hands.

CHARLES W. DAVIS.
DONALD M. SIMONS.

Witnesses:
   J. LAWRENCE HUNTER,
   RALPH B. WILCOX.

Witnesses:
   FRANK P. EVANS,
   HARRY W. REILLY.